(No Model.)
S. FARBAKY & S. SCHENEK.
SECONDARY BATTERY OR ACCUMULATOR.
No. 344,957. Patented July 6, 1886.
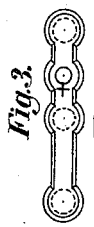
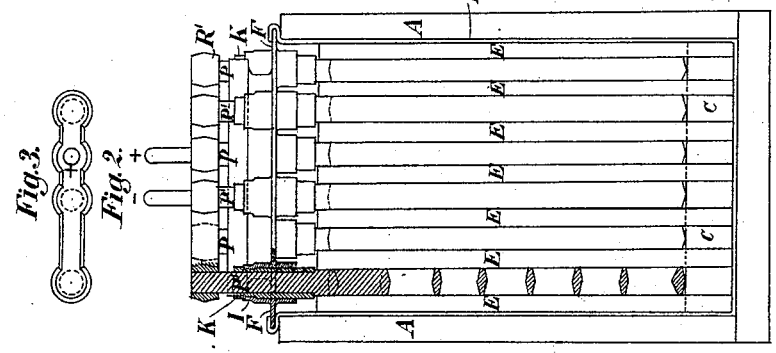
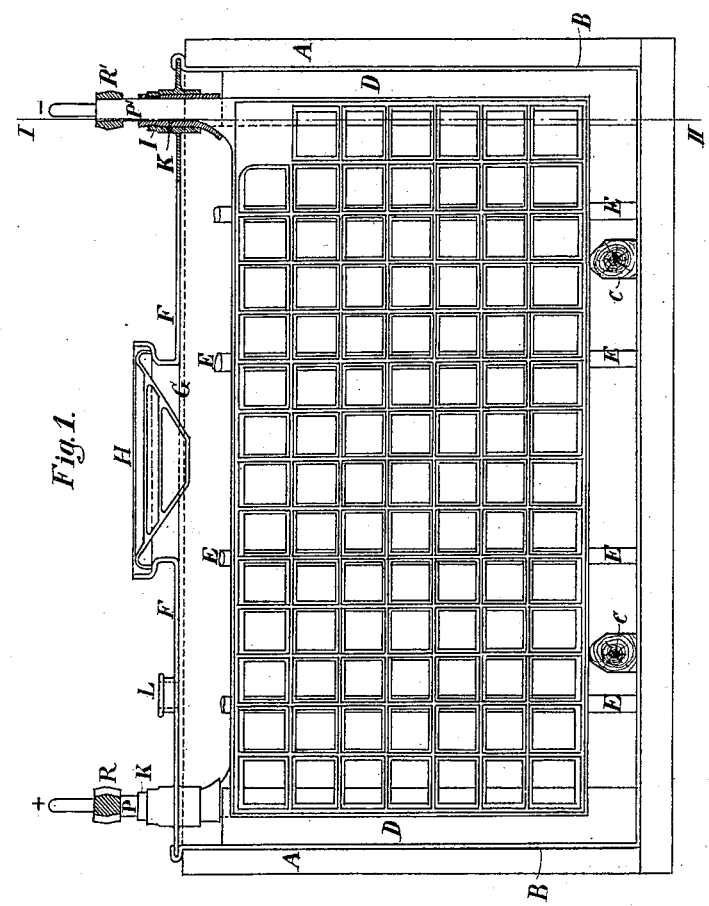
Attest:
Will T. Norton
H. G. Dieterich
Inventors
Stephen Farbaky & Dr. Stefen Schenek
by John J. Halstead & Son
their Atty's

UNITED STATES PATENT OFFICE.

STEPHEN FARBAKY AND STEFEN SCHENEK, OF SCHEMNITZ, AUSTRIA-HUNGARY.

SECONDARY BATTERY OR ACCUMULATOR.

SPECIFICATION forming part of Letters Patent No. 344,957, dated July 6, 1886.

Application filed November 21, 1885. Serial No. 183,556. (No model.)

*To all whom it may concern:*

Be it known that we, STEPHEN FARBAKY and STEFEN SCHENEK, citizens of Hungary, and residents of the city of Schemnitz, Austria-Hungary, have invented certain new and useful Improvements in Secondary Batteries or Accumulators, of which the following is a specification.

Our invention relates to improvements in secondary batteries or accumulators, by which the lead plates are packed with materials particularly prepared; and the object of our invention is to obtain a more efficient and steady working of such batteries, and to prevent the outfalling of the active materials from or out of the plates.

And in order that our invention may be fully understood, we shall now proceed to describe the same more particularly, reference being made to the accompanying drawings, in which—

Figure 1 is a longitudinal section of our accumulator. Fig. 2 is a cross-section along the line I II of Fig. 1. Fig. 3 shows in plan a connecting-piece of the pole-bars.

Our accumulators or secondary batteries (for which we have made another and independent application for a United States patent, and which, therefore, we do not claim in the present application) consist of any number of plates of suitable size and form, the carcass or body of which is formed by rectangular grate or lattice shaped frames of cast or pressed lead. The openings or interstices of these lattice-plates are packed with a particularly-prepared material, which is fixed therein by a special treatment or proceeding. The strength or thickness of the plates, as well as of the packing material, will be different, according to the employment and function or duty of the plate as a positive or a negative one. The plates of the positive pole are in general thicker than those of the negative pole, in order to resist the corroding action of the ozonized oxygen and the expansion of the packing material. The thickness of the positive plates is about ten to twelve millimeters, and that of the negative about six to eight millimeters. The frames of the positive as well as of the negative pole plates have a prolongation or extension in the direction of one of the smaller sides, cast in one piece with the frame, which prolongation forms the pole of the electrode.

The special packing material or mass for the negative and for the positive plates, and which constitutes the subject-matter of this present application, we will now proceed to describe.

The packing material of the negative plates consists of ninety-five parts, by weight, of pulverized litharge (free of copper) and of five parts, by weight, of granulated pumice-stone, the diameter of the grains being about one to one and one-half millimeter. This pumice-stone is added for the purpose of loosening the mass, and for obtaining a greater porosity, which is of importance, as hereby the entering and escaping of the diluted sulphuric acid and the efficiency of the accumulator are essentially increased. These two materials are intimately mixed, in quantities of about ten to twenty kilograms, with sulphuric acid (free of arsenic) of 1.85 specific gravity, diluted with seventy-five per cent. of water, in order to form a pasty mass. We observe that the paste thus obtained must be friable, little moist, and of no plasticity. The resulting mass (the active material) is then brought into the holes or interstices of the lattice-frame by means of a tinned iron spoon or spatula, and distributed in such a manner that the mass projects about three or four millimeters over the lead frames. This packing material is then fixed into the frames by beating (not striking) it with a flat brass bar until a visible sweating of the material is produced, whereupon that part of the mass which projects over the frame (viz., the excess of it) is cut away or scraped off and leveled by means of a long knife. Hitherto for the fixing of the active material in the lead plates it was necessary to employ a considerable pressure, obtained by means of a powerful press, &c., while according to our invention the same result, and even a better one, is obtained in a very simple and uncostly manner. The frame is then turned and the other side of the plate is treated in a similar manner. The element or plate is then dried.

The packing or active material of the positive-pole plates consists of ninety-five parts, by weight, of litharge, ninety-five parts, by weight, of minium, and ten parts, by weight, of coke, in the form of a powder of about one to one and one-half millimeter diameter. These materials are intimately mixed in a dry state and packed into the positive-plate frames in a similar manner as heretofore described for the negative plates. By the addition of the pulverized coke we attain two essential advantages—viz., first, the mass, which in itself is not conductive, becomes thoroughly conductive; and, secondly, in consequence of its porosity, the coke causes a loosening of the entire mass and absorbs easily the sulphuric acid. The plates thus prepared are dried in free air or otherwise during two to three days. We observe that during this drying the water is not only vaporized, but that a combination of the oxide of lead with sulphuric acid takes place, making thus the material considerably more cohesive.

In order to obtain a higher degree of hardness and solidity of the plates, and principally to prevent the softening and falling out of the active materials from the plates, we submit them, after drying, to the following treatment: We prepare a bath of sulphuric acid of 1.85 Baumé, diluted with seventy-five per cent. water, in a chest or trough lined with lead. In this bath the plate is rapidly dipped, then quickly taken out and left to drain. After twenty-four hours the plate is again dipped into and kept in the above bath until the produced effervescence ceases almost entirely. In case the bath should become turbid, like milk, around the plates, the latter must immediately be taken out and left to dry. After a further twenty-four hours the plates are dipped into the bath for a third time, and left therein without danger for ten to twelve hours. By this treatment the upper layer on both sides of the plates becomes partially converted into sulphate of lead, which stiffens like cement, and prevents the material in the interior of the plates from falling out. Simultaneously the minium of the positive plates is converted partially into peroxide of lead, whereby the plates receive a chocolate-like appearance. The plates are now ready for being placed into the accumulator.

The box A, of wood, for the reception of the plates, is lined with sheets B, of lead, of sufficient thickness, (soldered with lead,) upon which is placed veneer of two to three millimeters' thickness, impregnated with paraffine. At the bottom of the lead-box are arranged, say, from four to six small prismatic blocks, C, of wood, (likewise impregnated with paraffine,) of two centimeters' breadth above and three centimeters' breadth below and three centimeters' height. When inserting the plates into the box, the latter is to be inclined at or near an angle of forty-five degrees, and in each of the corners a ledge, D, impregnated with paraffine, is fixed. These ledges are seven millimeters thick, and of such a breadth that the plates rest one and one-half to two centimeters' breadth on them. In the space between the above-described ledges are inserted ten to twelve wood staves, E, of a circular section and of seven millimeters' diameter, and of such a length that they project about one centimeter over the plates. The first negative plate is then pushed into the box. Two ledges are placed on the ends of that plate and ten to twelve staves between the ledges, whereupon a positive-pole plate is placed, and so on. The last plate must be a negative one.

The total number of plates in an accumulator may be conveniently varied, according to the dimensions and application of the accumulator.

In order to retain the plates firm in the box or cell, the plates are slightly pressed together and fastened with eight or ten strips of cork of six to seven millimeters' thickness, or of wooden wedges impregnated with paraffine, which are pushed in between the last (uppermost) plate and the wall of the box.

It is advisable to insulate the plates by means of paper, (treated with nitric acid,) in order to prevent a short circuit in such cases when particles of the active material should fall out from the plates during their transport.

The plates prepared in the above-described manner are so placed in the box that the bars P of the positive pole are directed to one side and the bars P' of the negative pole to the other side of the accumulator.

In order to prevent as much as possible vaporization of the diluted sulphuric acid, we cover the accumulator with a sufficiently-thick sheet of lead, F. In the center of this cover F we make a circular opening, G, of about seventy to one hundred millimeters' diameter, and fix a tube of lead of three to four centimeters' length. This tube is closed with a conical-shaped cover, H, of lead. The opening G serves only for the introduction of the diluted sulphuric acid. It is a circular opening in the center of the lead cover F, and is of about seventy to one hundred millimeters' diameter, bounded by a tube of lead and closed with a conical-shaped cover, H, to allow the dropping of the acid splashed up during the charging. The covers have round holes on both sides corresponding to the number of the positive and negative pole bars which have to pass through these holes. In the latter are inserted short tubes I, of lead, projecting about one centimeter in length above and below. The pole-bars are coated with tubes K, of india-rubber, in order to insulate the same from the plate of the cover. At one corner of the plate of the cover is soldered a tube, L, of lead, (of two centimeters' length,) through which the acid may be drawn off from the box by means of a siphon. After the cover has been placed and connected with the lead lining B of the box the positive and negative pole bars P P' are suitably connected by bars of lead, R, on the ends of which are soldered pieces of tinned copper wire, which serve as poles and carry the pole-jaws. The accumulator is now filled with sulphuric acid of 1.85 specific gravity, diluted with seventy per cent. water, and may be at once submitted to the "formation," (charged.)

Our improved secondary batteries or accumulators offer the following advantages:

(*a*) A more efficient and steady action, in consequence of the increase of the active surface.

(*b*) A longer durability, as the sulphuric acid is allowed to enter and escape more freely.

We have found by practice that our accumulators lose during fifty-five days thirty-eight per cent. of energy, and as this loss gradually diminishes, our accumulators will be entirely discharged only after five or six months' use.

(*c*) The prevention of the vaporization of the sulphuric acid and its pernicious consequences by our air-tight cover.

(*d*) The use of the positive and negative connecting-rods of lead outside the box protects them against the corrosive action of the sulphuric acid.

(*e*) The use of filtering-paper treated with nitric acid, instead of parchment, placed between the plates of the accumulator, prevents every short circuit in the accumulator.

(*f*) The manufacture of our accumulators is very cheap in comparison with those now in use, as all the necessary materials—litharge, minium, coke, pumice-stone, lead, and sulphuric acid—are obtained at moderate costs.

We claim as our invention—

In the manufacture of secondary batteries or accumulators, a packing mass or active material composed for the negative plates of litharge and pumice-stone, and for the positive plates of litharge, minium, and coke, mixed in the proportions and treated with sulphuric acid in the manner essentially as hereinbefore described.

Signed at Vienna, in the Empire of Austria-Hungary, this 24th day of October, A. D. 1885.

STEPHEN FARBAKY.
STEFEN SCHENEK.

In presence of—
  EDMUND JUSSEN,
  ED. SCHENEK.